(12) United States Patent
Lee et al.

(10) Patent No.: US 9,134,404 B2
(45) Date of Patent: Sep. 15, 2015

(54) ELECTRONIC DEVICE AND METHOD FOR SENSING ACTIVE STATE OF OBJECT

(71) Applicant: Industrial Technology Research Institute, Hsinchu (TW)

(72) Inventors: Yen-Hsien Lee, Taoyuan County (TW); Wen-Jen Tseng, Hsinchu (TW); Hong-Dun Lin, Taipei (TW)

(73) Assignee: Industrial Technology Research Institute, Hsinchu (TW)

( * ) Notice: Subject to any disclaimer, the term of this patent is extended or adjusted under 35 U.S.C. 154(b) by 313 days.

(21) Appl. No.: 13/743,319

(22) Filed: Jan. 16, 2013

(65) Prior Publication Data

US 2014/0152491 A1  Jun. 5, 2014

(30) Foreign Application Priority Data

Nov. 30, 2012  (TW) .............................. 101145184 A

(51) Int. Cl.
*G01S 7/28* (2006.01)
*G01S 13/10* (2006.01)
(Continued)

(52) U.S. Cl.
CPC ................. *G01S 13/106* (2013.01); *G01S 7/03* (2013.01); *G01S 13/58* (2013.01)

(58) Field of Classification Search
CPC ..... G01S 13/56; G01S 13/18; G01S 13/0209; G01S 13/58; G01S 13/106; G01S 7/03
USPC .................................... 342/28, 195, 202–204
See application file for complete search history.

(56) References Cited

U.S. PATENT DOCUMENTS

| 4,617,567 A | 10/1986 | Chan |
| 5,361,070 A * | 11/1994 | McEwan .......................... 342/21 |

(Continued)

FOREIGN PATENT DOCUMENTS

| CN | 101566690 | 10/2009 |
| CN | 202275933 | 6/2012 |

(Continued)

OTHER PUBLICATIONS

Chen et al., "Comb-Shaped Dipole Antenna on Transparent Substrate," IEEE Antennas and Propagation Society International Symposium 3A, Jul. 3-8, 2005, pp. 610-612.

(Continued)

*Primary Examiner* — John B Sotomayor
*Assistant Examiner* — Marcus Windrich
(74) *Attorney, Agent, or Firm* — Jianq Chyun IP Office

(57) ABSTRACT

An electronic device and a method for sensing an active state of an object are provided; the electronic device includes a signal generating module, a non-symmetric antenna module and a signal analyzing module. The signal generating module is configured to generate a pulse width modulation signal, generate a measuring signal with overshoot and undershoot pulses according to the pulse width modulation signal, and generate a reference signal according to the measuring signal. The non-symmetric antenna module includes a transmitting antenna and a receiving antenna. The transmitting antenna is configured to transmit the measuring signal to an object. The receiving antenna is configured to receive the measuring signal reflected by the object. The signal analyzing module is configured to receive and process the reference signal and the measuring signal reflected by the object, so as to obtain an object active state signal.

8 Claims, 5 Drawing Sheets

(51) Int. Cl.
*G01S 13/58* (2006.01)
*G01S 7/03* (2006.01)

(56) References Cited

U.S. PATENT DOCUMENTS

| | | | |
|---|---|---|---|
| 5,790,015 | A | 8/1998 | Iitsuka |
| 5,825,323 | A | 10/1998 | Heide |
| 5,966,090 | A * | 10/1999 | McEwan .......................... 342/27 |
| 5,986,600 | A * | 11/1999 | McEwan .......................... 342/28 |
| 6,215,438 | B1 | 4/2001 | Oswald et al. |
| 6,426,716 | B1 * | 7/2002 | McEwan .......................... 342/28 |
| 6,467,338 | B1 | 10/2002 | Irle et al. |
| 6,492,933 | B1 | 12/2002 | McEwan |
| 6,753,780 | B2 | 6/2004 | Li |
| 6,967,612 | B1 | 11/2005 | Gorman et al. |
| 7,068,225 | B2 | 6/2006 | Schantz |
| 7,504,992 | B2 | 3/2009 | Pilcher, Jr. et al. |
| 7,725,150 | B2 | 5/2010 | Tupin, Jr. et al. |
| 7,855,586 | B2 | 12/2010 | Wang et al. |
| 7,952,515 | B2 | 5/2011 | McEwan |
| 8,120,524 | B2 | 2/2012 | Zemany |
| 8,721,554 | B2 * | 5/2014 | Lin et al. ....................... 600/484 |
| 2005/0068228 | A1 * | 3/2005 | Burchfiel ................. 342/357.06 |
| 2006/0220944 | A1 * | 10/2006 | Ikeda ............................. 342/70 |
| 2009/0128247 | A1 * | 5/2009 | Kobayashi et al. ........... 332/149 |
| 2010/0106041 | A1 | 4/2010 | Ghovanloo et al. |
| 2012/0249355 | A1 * | 10/2012 | Haugen et al. .................. 342/21 |
| 2013/0135137 | A1 * | 5/2013 | Mulder et al. .................. 342/28 |

FOREIGN PATENT DOCUMENTS

| | | |
|---|---|---|
| EP | 0941484 | 2/2005 |
| TW | M262855 | 4/2005 |
| TW | 200610226 | 3/2006 |
| TW | I306023 | 2/2009 |
| TW | 201239571 | 10/2012 |

OTHER PUBLICATIONS

Jung et al., "Broadband flexible comb-shaped monopole antenna," IET Microwaves, Antennas & Propagation 3 (2), Mar. 2009, pp. 325-332.

Deng et al., "Comb-shaped antenna on magneto-dielectric substrate for DVB-H reception," International Conference on Microwave and Millimeter Wave Technology, Apr. 18-21, 2007, pp. 1-3.

Wu et al, "Using the Phase Change of a Reflected Microwave to Detect a Human Subject Behind a Barrier," IEEE Transactions on Biomedical Engineering 55 (1), Jan. 2008, pp. 267-272.

Lai et al., "Wireless Sensing of Human Respiratory Parameters by Low-Power Ultrawideband Impulse Radio Radar," IEEE Transactions on Instrumentation and Measurement 60 (3), Mar. 2011, pp. 928-938.

Zito et al., "SoC CMOS UWB Pulse Radar Sensor for Contactless Respiratory Rate Monitoring," IEEE Transactions on Biomedical Circuits and Systems 5 (6), Dec. 2011, pp. 503-610.

* cited by examiner

ELECTRONIC DEVICE AND METHOD FOR SENSING ACTIVE STATE OF OBJECT

CROSS-REFERENCE TO RELATED APPLICATION

This application claims the priority benefit of Taiwan application serial no. 101145184, filed on Nov. 30, 2012. The entirety of the above-mentioned patent application is hereby incorporated by reference herein and made a part of this specification.

TECHNICAL FIELD

The disclosure relates to an electronic device and a method for sensing an active state of an object through a measuring signal with overshoot and undershoot pulses.

BACKGROUND

With the progress of the antenna technology, the size of the antenna grows smaller and smaller. Generally speaking, the quality and strength of the signal received by the antenna are more or less relevant to the size of the antenna. In particular, for antenna for sensing an active state of an object, the quality and strength of the signal received by the antenna are critical to the degree of sensing accuracy.

Therefore, in general, if the quality and strength of the signal received by the antenna are to be improved, the size of the antenna usually has to be enlarged.

SUMMARY

In light of the above, the disclosure provides an electronic device and a method for sensing an active state of an object which measure an active state of an object and effectively improve a quality and/or a strength of a signal received by an antenna.

The disclosure provides an electronic device which includes a signal generating module, a non-symmetric antenna module and a signal analyzing module. The signal generating module is configured to generate a pulse width modulation signal, generate a measuring signal with overshoot and undershoot pulses according to the pulse width modulation signal, and generate a reference signal according to the measuring signal. The non-symmetric antenna module includes a transmitting antenna and a receiving antenna. The transmitting antenna is coupled to the signal generating module and is configured to transmit the measuring signal to an object. The receiving antenna is configured to receive the measuring signal reflected by the object. The signal analyzing module is coupled to the signal generating module and the receiving antenna of the non-symmetric antenna module and is configured to receive and process the reference signal and the measuring signal reflected by the object, so as to obtain an object active state signal.

In addition, the disclosure further provides a method for sensing an active state of an object. The method includes following steps. A measuring signal with overshoot and undershoot pulses is generated, and a reference signal is generated according to the measuring signal. The measuring signal is transmitted to an object by a transmitting antenna of a non-symmetric antenna module. The measuring signal reflected by the object is received by a receiving antenna of the non-symmetric antenna module. The reference signal and the measuring signal reflected by the object are received and processed so as to obtain an object active state signal.

Based on the above, the electronic device and the method for sensing the active state of the object of the disclosure transmit the measuring signal with the overshoot and undershoot pulses by the transmitting antenna of the non-symmetric antenna module and obtain the object active state signal according to the reflected signal received by the receiving antenna of the non-symmetric antenna module so as to learn active state information of a target object. In this way, a size of an antenna of the electronic device is effectively reduced, and a degree of sensing accuracy for sensing the active state information of the target object is improved.

Several exemplary embodiments accompanied with figures are described in detail below to further describe the disclosure in details.

BRIEF DESCRIPTION OF THE DRAWINGS

The accompanying drawings are included to provide further understanding, and are incorporated in and constitute a part of this specification. The drawings illustrate exemplary embodiments and, together with the description, serve to explain the principles of the disclosure.

DETAILED DESCRIPTION OF DISCLOSED EMBODIMENTS

Figure 1:
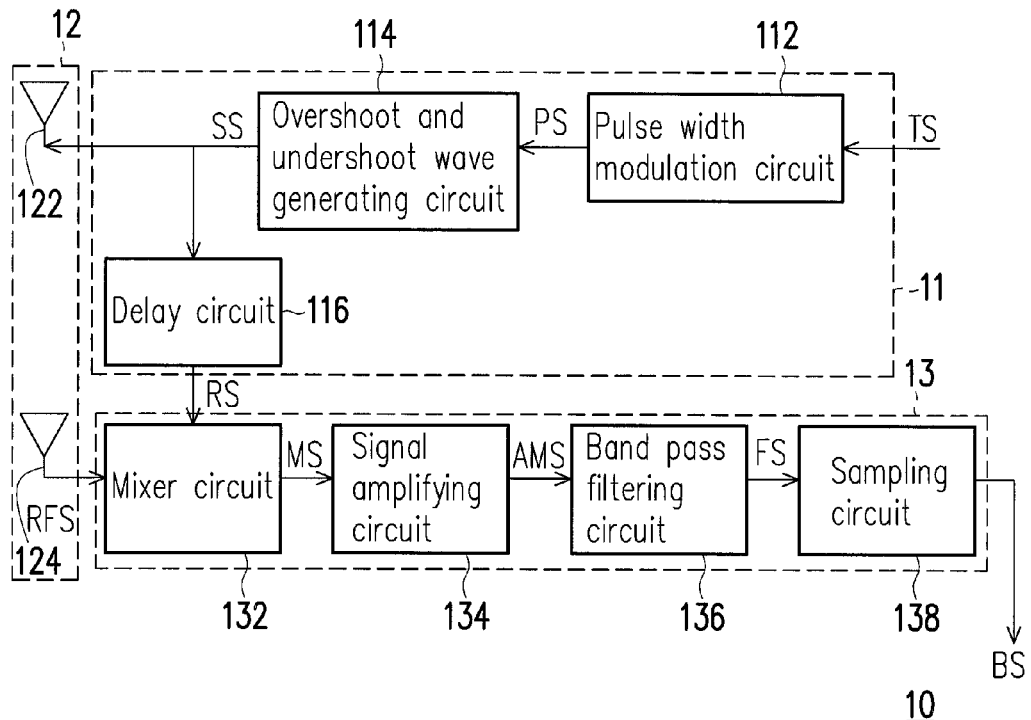
FIG. 1 is a schematic view of an electronic device according to an embodiment of the disclosure.

FIG. 1 is a schematic view of an electronic device according to an embodiment of the disclosure. Referring to FIG. 1, an electronic device 10 includes a signal generating module 11, a non-symmetric antenna module 12 and a signal analyzing module 13.

The signal generating module 11 is configured to generate a pulse width modulation signal PS and generate a measuring signal SS with overshoot and undershoot pulses according to the pulse width modulation signal PS. In other words, in the present embodiment, the measuring signal SS has characteristics of a pulse wave and overshoot and undershoot waves on the pulse wave at the same time. In addition, the pulse width modulation signal PS is a pulse width modulation signal generated by a known pulse width modulation (PWM) technique, or the pulse width modulation signal PS may be implemented by a pulse wave or a square wave with a fixed cycle, which is not limited in the disclosure.

Then, the signal generating module 11 may further generate a reference signal RS according to the measuring signal SS. In the present embodiment, the reference signal RS is generated, for example, by delaying the measuring signal SS. A detailed structure of the signal generating module 11 is described in later parts.

The non-symmetric antenna module 12 includes a transmitting antenna 122 and a receiving antenna 124. The transmitting antenna 122 is coupled to the signal generating module 11 and is configured to transmit the measuring signal SS to an object (hereinafter referred to as a target object). In the present embodiment, the target object is, for example, a human body or various objects that may reflect the measuring signal SS, which is not limited in the disclosure. The receiving antenna 124 is configured to receive the measuring signal SS reflected by the object (hereinafter referred to as a reflected signal RFS). In other words, the reflected signal RFS is the measuring signal SS reflected by the target object when the measuring signal SS hits the target object. In addition, in the present embodiment, the transmitting antenna 122 and the receiving antenna 124 may be disposed on the same substrate, and structures of the transmitting antenna 122 and the receiving antenna 124 are not symmetric to each other.

The signal analyzing module 13 is coupled to the signal generating module 11 and the receiving antenna 124 of the non-symmetric antenna module 12 and is configured to receive and process the reference signal RS and the measuring signal reflected by the object (i.e. the reflected signal RFS), so as to obtain an object active state signal BS.

To be more specific, when the measuring signal SS is continuously transmitted by the transmitting antenna 122 in the form of radiation, if the measuring signal SS hits the target object (such as a human body or various objects), then the reflected signal RFS is continuously reflected back because the measuring signal SS hits the target object and is received by the receiving antenna 124. In particular, when an active state or a movement state of the target object changes, an angle and/or a hitting position at which the measuring signal SS hits the target object also changes, thereby resulting in a change in a frequency, a waveform or a receiving time of the reflected signal RFS received by the receiving antenna 124. In other words, the disclosure effectively obtains real-time active state information of the target object by analyzing the reflected signal RFS.

It should be noted that situations in which the active state or the movement state of the target object changes are, for example, that the target object changes from a static state to a dynamic state, or that an amplitude or a vibration frequency of the target object in motion changes, which is not limited in the disclosure.

Take sensing the heartbeat or the vascular contraction state of the human body as an example. It is assumed that the heart rate of a person is between 60 to 100 beats per minute when the person is calm. When the person starts doing exercise, like jogging, which makes the heart rate speed up (to 120 beats per minute, for example), the subcutaneous vascular contraction degree and/or contraction frequency may also change (for example, the vascular contraction degree may increase and/or the contraction frequency may increase). At this time, if the measuring signal (such as the measuring signal SS) is continuously transmitted to the skin of the person, and the signal (such as the reflected signal RFS) reflected by the skin of the person is analyzed, then it is learned that the active state or the movement state of the skin or the subcutaneous blood vessels has changed/is changing, and the active state or the movement state information of the skin or the subcutaneous blood vessels before/after the change is also obtained.

However, the disclosure is not limited to the above applications. In other embodiments, the disclosure may also be applied in other application domains, such as rainfall monitoring. For example, the electronic device 10 may be disposed in a vehicle. When raindrops drop on a windscreen panel of the vehicle, the electronic device 10 is able to recognize that there is a change (such as raindrops falling away) in an active state of the windscreen panel of the vehicle and automatically activate a wiper function. In addition, the disclosure may also be applied in anti-theft monitoring, non-contact touch control, anti-trap security monitoring and/or vibration monitoring and so forth.

In detail, to generate the measuring signal SS that has characteristics of a pulse and overshoot and undershoot waves on the pulse wave, in the present embodiment, the signal generating module 11 may include a pulse width modulation circuit 112, an overshoot and undershoot wave generating circuit 114 and a delay circuit 116.

The pulse width modulation circuit 112 is configured to generate a pulse width modulation signal PS according to a clock signal TS. In the present embodiment, the clock signal TS is generated, for example, by a clock signal generator (not shown), and a cycle or frequency of the clock signal TS may be adjusted according to practical or design requirements, which is not limited in the disclosure. In addition, in the present embodiment, the pulse width modulation circuit 112 generates the pulse width modulation signal PS by, for example, a known pulse width modulation technique, and a detailed description thereof is omitted herein.

The overshoot and undershoot wave generating circuit 114 is coupled to the pulse width modulation circuit 112 and the transmitting antenna 122 and is configured to modulate the pulse width modulation signal PS to be the measuring signal SS with the overshoot and undershoot pulses by means of digital signal processing.

For example, in the present embodiment, the overshoot and undershoot wave generating circuit 114 may include a NAND gate or an AND gate. Because of signal characteristics of the pulse width modulation signal PS itself, when the pulse width modulation signal PS passes through the NAND gate or the AND gate of the overshoot and undershoot wave generating circuit 114, a signal waveform of the pulse width modulation signal PS is modulated from an original relatively smooth pulse wave signal waveform to a pulse wave signal waveform with overshoot and undershoot waves.

Figure 2:
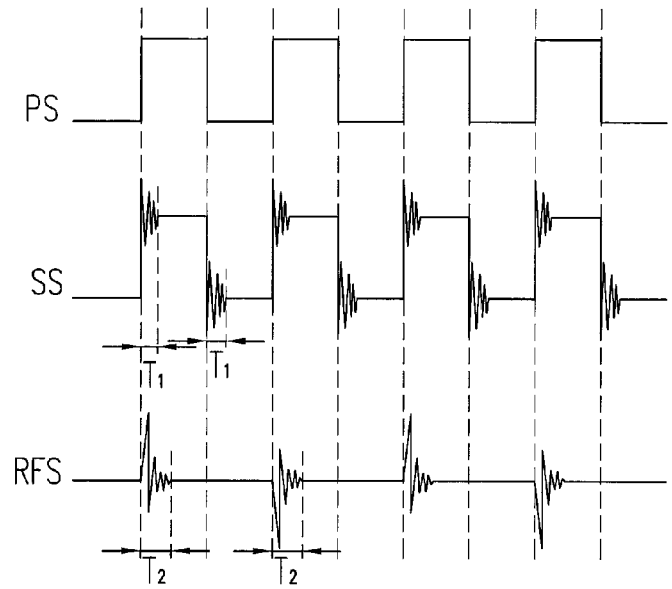
FIG. 2 is a schematic view of a pulse signal, a measuring signal and a reflected signal according to an embodiment of the disclosure.

FIG. 2 is a schematic view of a pulse signal, a measuring signal and a reflected signal according to an embodiment of the disclosure. Referring to FIG. 2, in the present embodiment, the pulse width modulation signal PS is, for example, a pulse width modulation signal. After an overshoot and undershoot wave generating circuit (such as the overshoot and undershoot wave generating circuit 114) modulates the overshoot and undershoot waves of the pulse width modulation signal PS, the generated measuring signal SS is able to have characteristics of a pulse wave and overshoot and undershoot waves on the pulse wave at the same time.

More specifically, take the pulse width modulation signal PS and the measuring signal SS in FIG. 2 as an example. When a value of the pulse width modulation signal PS switches from a high value to a low value or switches from a low value to a high value, the pulse width modulation signal PS soon stabilizes because of the characteristics of the pulse width modulation technique itself. On the contrary, when a value of the measuring signal SS switches from a high value to a low value or switches from a low value to a high value, the measuring signal SS first undergoes a short shocking period (such as a shocking period T1). In this shocking period (such as the shocking period T1), the value of the measuring signal SS fluctuates and forms a waveform similar to a shock wave. After this shocking period, the measuring signal SS becomes stable.

In particular, since the reflected signal RFS is generated by the measuring signal SS with the overshoot and undershoot pulses hitting the target object and then being reflected back, the reflected signal RFS that is generated by reflection also has a similar shocking period (such as a shocking period T2). After this shocking period (such as the shocking period T2), the reflected signal RFS becomes stable. In this way, the disclosure more accurately senses and judges the active state of the target object by analysing the reflected signal that also has overshoot and undershoot pulses.

Referring to FIG. 1 again, the delay circuit 116 is coupled to the overshoot and undershoot wave generating circuit 114 and the signal analyzing module 13 and is configured to generate a reference signal RS according to the measuring signal SS. For example, in the present embodiment, the delay circuit 116 may include at least one variable resistor and at least one capacitor and is able to delay the measuring signal SS for a predetermined period of time (such as 20 milliseconds) before transmitting the measuring signal SS. The disclosure does not limit implementation forms of the delay circuit 116. Any implementation form having a signal delay function is applicable. In addition, the actual delay time (such as the predetermined period of time) may be adjusted according to practical or design requirements, which is not limited in the disclosure. In this way, the signal analyzing module 13 uses the delayed measuring signal SS as the reference signal RS and subsequently analyzes and processes the received reflected signal RFS through the reference signal RS.

For example, the signal analyzing module 13 may include a mixer circuit 132, a signal amplifying circuit 134, a band pass filtering circuit 136 and a sampling circuit 138.

The mixer circuit 132 is coupled to the receiving antenna 124 of the non-symmetric antenna module 12 and the delay circuit 116 and is configured to mix the reflected signal RFS and the reference signal RS to be a mixing signal MS. In other words, since the reflected signal RFS is generated by the measuring signal SS hitting the target object and then being reflected back, the reflected signal RFS in theory also carries the measuring signal SS and the active state information of the target object. Therefore, the reflected signal RFS may be viewed as a composite signal composed of the measuring signal SS and the active state information of the target object.

In particular, since the reference signal RS is generated by delaying the measuring signal SS, the mixer circuit 132 may use the reference signal RS to eliminate a component relevant to the measuring signal SS in the composite signal. For example, the mixer circuit 132 obtains phase difference information between the reference signal RS and the reflected signal RFS based on a time sequence relationship between the reference signal RS and the reflected signal RFS so as to output the mixing signal MS with the phase difference information.

The signal amplifying circuit 134 is coupled to the mixer circuit 132 and is configured to amplify the mixing signal MS to be an amplified mixing signal AMS. The band pass filtering circuit 136 is coupled to the signal amplifying circuit 134 and is configured to perform a filtering operation on the amplified mixing signal AMS to generate a filtered signal FS. The sampling circuit 138 is coupled to the band pass filtering circuit 136 and is configured to perform a sampling operation on the filtered signal FS to obtain the object active state signal BS. Because the signal amplifying circuit 134, the band pass filtering circuit 136 and the sampling circuit 138 are not the focus of the disclosure and may all be adjusted according to practical or design requirements, detailed descriptions thereof are omitted herein.

Figure 3:
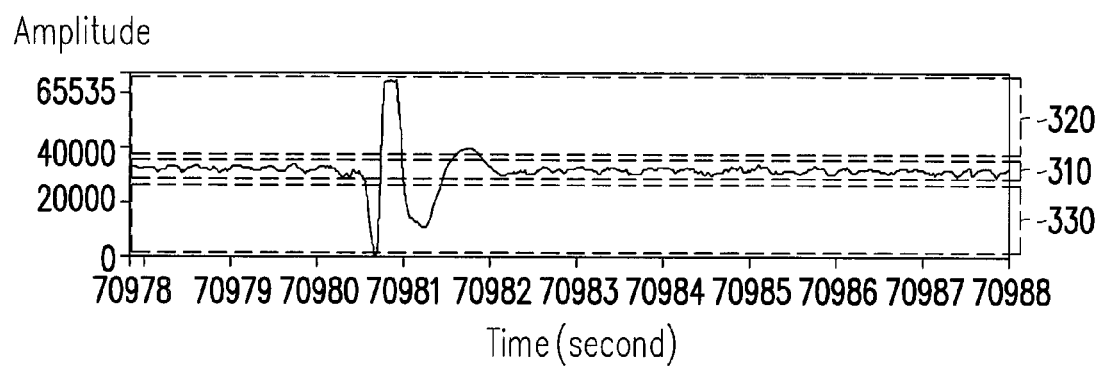
FIG. 3 is a schematic view of an object active state signal according to an embodiment of the disclosure.

FIG. 3 is a schematic view of an object active state signal according to an embodiment of the disclosure. Referring to FIG. 3, in the present embodiment, in order to improve the degree of sensing accuracy, if a signal value of the object active state signal BS falls in a noise interval 310, which indicates that the active state of the object is a quiescent state, then slight fluctuations in the object active state signal BS are regarded as noise. In particular, when the signal value of the object active state signal BS falls in effective signal intervals 320 and 330, the active state of the target object is a motion state (such as vibration). In addition, the more intense the movement state of the target object is, the more fluctuating the signal value of the object active state signal BS is. Therefore, after a simple signal conversion processing, the real-time active state information corresponding to the object active state signal BS is generated.

For example, after the signal analyzing module 13 obtains the object active state signal BS, the disclosure may perform a simple signal conversion processing on the object active state signal BS with a microprocessor of the electronic device 10 or other computer devices and display the real-time active state information of the target object that is monitored on any interface.

In addition to judging the active state of the target object according to an amplitude change of the object active state signal BS in a time domain, in other embodiments, the active state of the target object may also be judged by analyzing a change in vibration frequency of the object active state signal BS in a frequency domain, which is not limited in the disclosure.

It should be noted that in the present embodiment, the transmitting antenna 122 and the receiving antenna 124 of the non-symmetric antenna module 12 are implemented with non-symmetric structures, so the reflected signal RFS with a better quality and/or a stronger signal strength is obtained.

Figure 4:
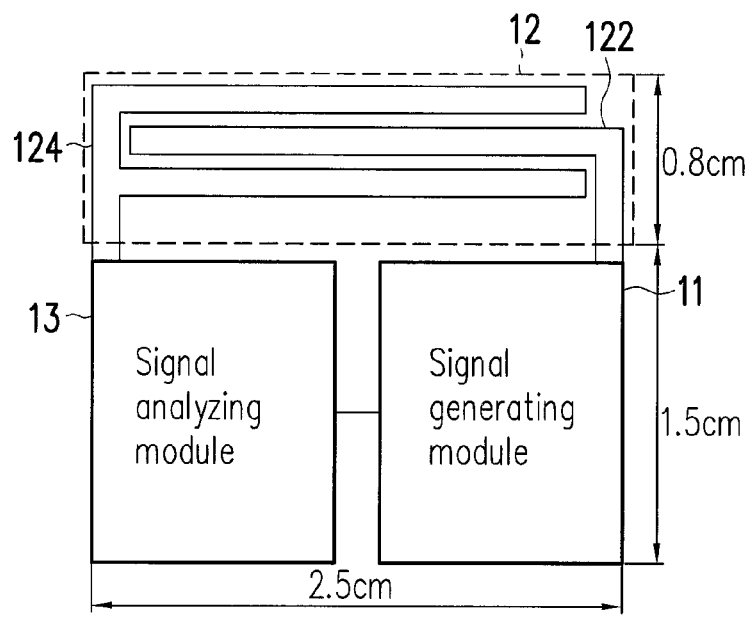
FIG. 4 is a schematic view of a non-symmetric antenna module according to an embodiment of the disclosure.

FIG. 4 is a schematic view of a non-symmetric antenna module according to an embodiment of the disclosure. Referring to FIG. 4, in the present embodiment, both the transmitting antenna 122 and the receiving antenna 124 of the non-symmetric antenna module 12 may be comb-type antennae. In addition, since the signal generating module 11 and the signal analyzing module 13 are described in detail in the embodiment of FIG. 1, detailed descriptions thereof are omitted herein.

Furthermore, an antenna area of the non-symmetric antenna module 12 may directly influence a sensible area and/or a sensible sensing distance of the target object; therefore, though in the present embodiment, a sum of areas of the signal generating module 11 and the signal analyzing module 13 is about 3.75 (1.5×2.5=3.75) cm$^2$, and an area of the non-symmetric antenna module 12 is about 2 (0.8×2.5=2) cm$^2$, but the disclosure is not limited thereto.

Figure 5:
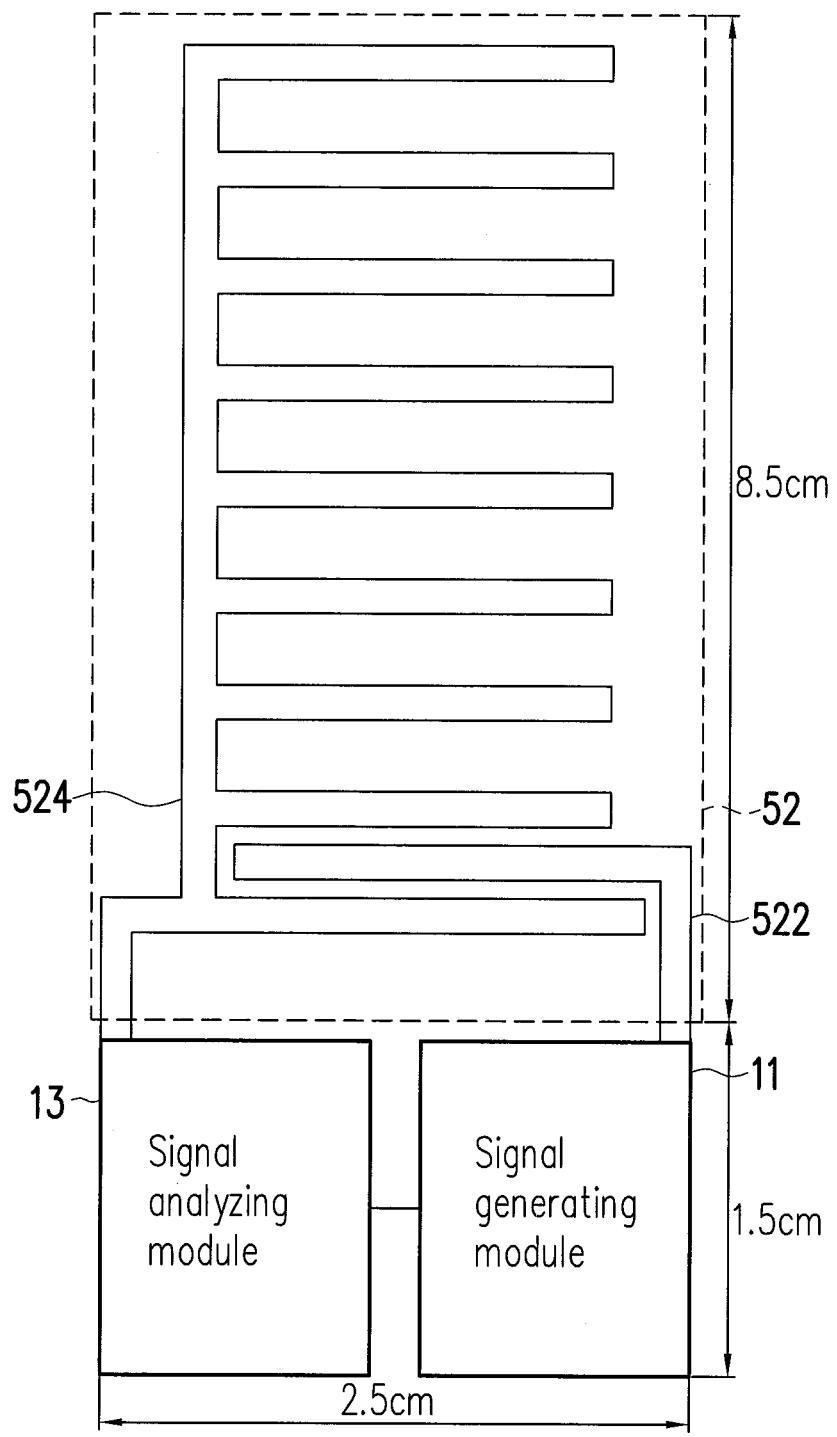
FIG. 5 is a schematic view of a non-symmetric antenna module according to another embodiment of the disclosure.

For example, FIG. 5 is a schematic view of a non-symmetric antenna module according to another embodiment of the disclosure. Referring to FIG. 5, in the present embodiment, both a transmitting antenna 522 and a receiving antenna 524 of a non-symmetric antenna module 52 are comb-type antennae. In addition, since the signal generating module 11 and the signal analyzing module 13 are described in detail in the embodiment of FIG. 1, detailed descriptions thereof are omitted herein.

In the present embodiment, the sum of the areas of the signal generating module 11 and the signal analyzing module 13 is also about 3.75 (1.5×2.5=3.75) cm$^2$. However, an area of the non-symmetric antenna module 52 is increased to about 21.25 (8.5×2.5=21.25) cm². In this way, with a larger antenna area, a sensing scope of the non-symmetric antenna module 52 is larger than a sensing scope of the non-symmetric antenna module 12 and may be used to sense an active state of a target object in a larger region or at a longer distance.

It should be noted that though both of the transmitting antennae 122 and 522 of the non-symmetric antenna modules 12 and 52 shown in FIGS. 4 and 5 have only one radiating arm, the number of the radiating arms of each of the transmitting antennae 122 and 522 and the receiving antennae 124 and 524 may be increased or decreased according to practical or design requirements, which is not limited in the disclosure. In addition, the transmitting antennae 122 and 522 of the non-symmetric antenna modules 12 and 52 shown in FIGS. 4 and 5 may be respectively implemented with other types of antennae, which is not limited in the disclosure.

Or in other embodiments, due to concerns of costs or other technical factors, the disclosure may implement the transmitting antenna 122 and the receiving antenna 124 of the non-symmetric antenna module 12 with traditional symmetric antenna structures, which is not limited in the disclosure.

Figure 6:
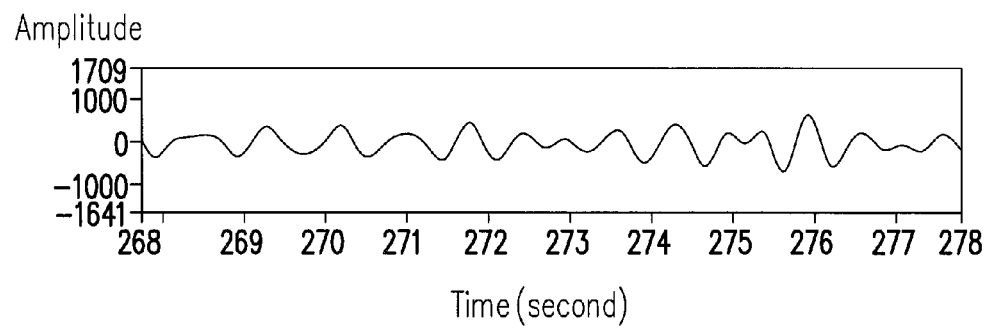
FIG. 6 is a schematic view of a waveform of a reflected signal measured by a traditional symmetric antenna.

FIG. 6 is a schematic view of a waveform of a reflected signal measured by a traditional symmetric antenna. Referring to FIG. 6, if an electronic device (such as the electronic device 10) uses a traditional symmetric antenna to replace a non-symmetric antenna module (such as the non-symmetric antenna module 12), then a signal strength (i.e. amplitude) of a measured reflected signal is between about −1000 to about 1000.

Figure 7:
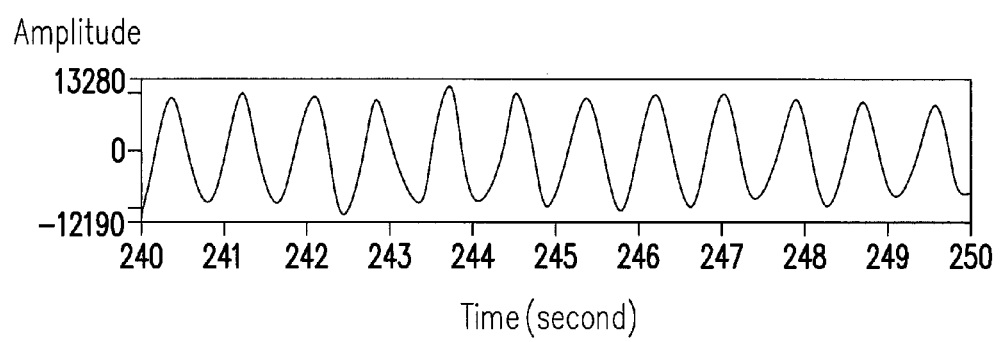
FIG. 7 is a schematic view of a waveform of a reflected signal measured by a non-symmetric antenna according to an embodiment of the disclosure.

FIG. 7 is a schematic view of a waveform of a reflected signal measured by a non-symmetric antenna according to an embodiment of the disclosure. Referring to FIG. 7, in the present embodiment, an electronic device (such as the electronic device 10) uses a non-symmetric antenna module (such as the non-symmetric antenna module 12 of FIG. 4) to transmit and receive a reflected signal (such as the reflected signal RFS).

As shown in FIG. 7, a signal strength (i.e. amplitude) of the reflected signal (such as the reflected signal RFS) measured in the present embodiment is between about −12190 to about 13280, which shows that using a non-symmetric antenna module (such as the non-symmetric antenna module 12) indeed effectively improves the signal strength and the signal quality sensed by the antenna. In addition, the accuracy of judging the active state of the target object is also improved.

Figure 8:
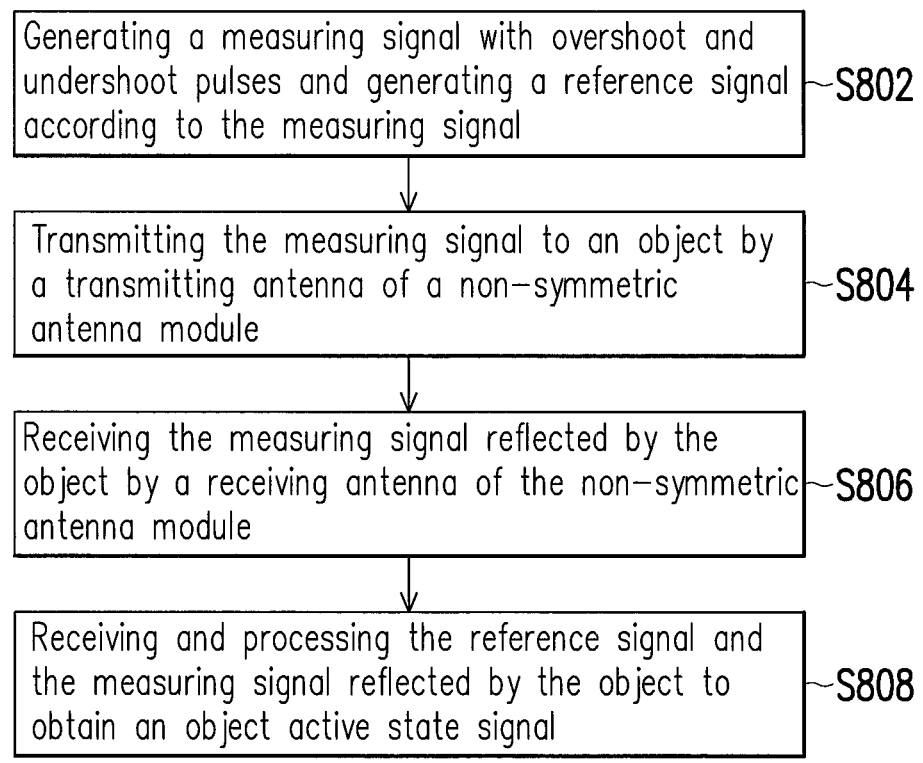
FIG. 8 is a schematic flow chart of a method for sensing an active state of an object according to an embodiment of the disclosure.

FIG. 8 is a schematic flow chart of a method for sensing an active state of an object according to an embodiment of the disclosure. In order to facilitate illustration, the method for sensing the active state of the object of the disclosure is described with reference to FIGS. 1 and 8. However, it should be noted that the method for sensing the active state of the object of the disclosure is not limited to being implemented by the electronic device 10 of FIG. 1.

First, referring to both FIGS. 1 and 8, in Step S802, the signal generating module 11 generates the measuring signal SS with the overshoot and undershoot pulses and generates the reference signal RS according to the measuring signal SS. Then, in Step S804, the measuring signal SS is transmitted by the transmitting antenna 122 of the non-symmetric antenna module 12 to a target object. Thereafter, in Step S806, the measuring signal reflected by the target object (i.e. the reflected signal RFS) is received by the receiving antenna 124 of the non-symmetric antenna module 12. Finally, in Step S808, the signal analyzing module 13 receives and processes the reference signal RS and the measuring signal reflected by the target object (i.e. the reflected signal RFS), so as to obtain the object active state signal BS.

Regarding the implementation details of the method, sufficient teaching, suggestions and implementation illustrations are shown in the above embodiments, so the implementation details are omitted herein.

In summary of the above, the electronic device and the method for sensing the active state of the object of the disclosure generate the measuring signal with the overshoot and undershoot pulses and transmit the measuring signal by the transmitting antenna of the non-symmetric antenna module. Then, the reflected signal corresponding to the measuring signal is received by the receiving antenna of the non-symmetric antenna module. Finally, the reflected signal is analyzed to obtain the object active state signal of the target object and to learn the active state information of the target object. In this way, the disclosure effectively reduces the size of the antenna in the electronic device and improves the degree of sensing accuracy for sensing the active state information of the target object.

It will be apparent to those skilled in the art that various modifications and variations can be made to the structure of the disclosed embodiments without departing from the scope or spirit of the disclosure. In view of the foregoing, it is intended that the disclosure cover modifications and variations of this disclosure provided they fall within the scope of the following claims and their equivalents.

What is claimed is:

1. An electronic device, comprising:
a signal generating module configured to generate a pulse width modulation signal, generate a measuring signal with overshoot and undershoot pulses to be transmitted according to the pulse width modulation signal, and then generate a reference signal by delaying the measuring signal;
a non-symmetric antenna module, comprising:
a transmitting antenna coupled to the signal generating module and configured to transmit the measuring signal to an object; and
a receiving antenna configured to receive the measuring signal reflected by the object, wherein structures of the transmitting antenna and the receiving antenna are not symmetric to each other; and
a signal analyzing module coupled to the signal generating module and the receiving antenna of the non-symmetric antenna module and configured to receive and process the reference signal from the signal generating module and the measuring signal reflected by the object to obtain an object active state signal.

2. The electronic device according to claim 1, wherein the signal generating module comprises:
a pulse width modulation circuit configured to generate a pulse width modulation signal according to a clock signal;
an overshoot and undershoot wave generating circuit coupled to the pulse width modulation circuit and the transmitting antenna of the non-symmetric antenna module and configured to modulate the pulse width modulation signal to be the measuring signal with the overshoot and undershoot pulses by means of digital signal processing; and
a delay circuit coupled to the overshoot and undershoot wave generating circuit and the signal analyzing module and configured to generate the reference signal according to the measuring signal.

3. The electronic device according to claim 2, wherein the means of digital signal processing comprises a logic AND operation.

4. The electronic device according to claim 2, wherein the signal analyzing module comprises:
- a mixer circuit coupled to the receiving antenna of the non-symmetric antenna module and the delay circuit and configured to mix the measuring signal reflected by the object and the reference signal to be a mixing signal;
- a signal amplifying circuit coupled to the mixer circuit and configured to amplify the mixing signal to be an amplified mixing signal;
- a band pass filtering circuit coupled to the signal amplifying circuit and configured to perform a filtering operation on the amplified mixing signal to generate a filtered signal; and
- a sampling circuit coupled to the band pass filtering circuit and configured to perform a sampling operation on the filtered signal to obtain the object active state signal.

5. The electronic device according to claim 1, wherein the transmitting antenna and the receiving antenna of the non-symmetric antenna module respectively have a comb-shaped structure.

6. A method for sensing an active state of an object, the method being adapted for an electronic device, comprising:
- generating, through a signal generating module of the electronic device, a measuring signal with overshoot and undershoot pulses to be transmitted and then generating a reference signal by delaying the measuring signal;
- transmitting the measuring signal to an object by a transmitting antenna of a non-symmetric antenna module of the electronic device;
- receiving the measuring signal reflected by the object by a receiving antenna of the non-symmetric antenna module of the electronic device, wherein structures of the transmitting antenna and the receiving antenna are not symmetric to each other; and
- receiving and processing, through a signal analyzing module of the electronic device, the reference signal from the signal generating module and the measuring signal reflected by the object to obtain an object active state signal.

7. The method for sensing the active state of the object according to claim 6, wherein the step of generating, through the signal generating module of the electronic device, the measuring signal with the overshoot and undershoot pulses comprises:
- generating a pulse width modulation signal and modulating the pulse width modulation signal to be the measuring signal with the overshoot and undershoot pulses by means of digital signal processing.

8. The method for sensing the active state of the object according to claim 6, wherein the step of processing, through the signal analyzing module of the electronic device, the reference signal from the signal generating module and the measuring signal reflected by the object to obtain the object active state signal comprises:
- mixing the reference signal and the measuring signal reflected by the object to be a mixing signal;
- amplifying the mixing signal to be an amplified mixing signal;
- performing a filtering operation on the amplified mixing signal to generate a filtered signal; and
- performing a sampling operation on the filtered signal to obtain the object active state signal.

* * * * *